(12) United States Patent
Huang et al.

(10) Patent No.: US 8,348,358 B2
(45) Date of Patent: Jan. 8, 2013

(54) COMPUTER ENCLOSURE WITH SHIELD PLATE

(75) Inventors: Ri-Dong Huang, Shenzhen (CN); Yang-Ming Lin, Shenzhen (CN); Hsuan-Tsung Chen, Taipei Hsien (TW); Guang-Yao Lee, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 323 days.

(21) Appl. No.: 12/834,196

(22) Filed: Jul. 12, 2010

(65) Prior Publication Data

US 2011/0260595 A1 Oct. 27, 2011

(30) Foreign Application Priority Data

Apr. 21, 2010 (CN) .......................... 2010 1 0152012

(51) Int. Cl.
*A47B 81/00* (2006.01)

(52) U.S. Cl. .................................................. 312/223.2

(58) Field of Classification Search ............... 312/223.1, 312/223.2, 257.1, 263, 265.5, 265.6, 319.1, 312/322, 323, 291, 292; 361/679.58
See application file for complete search history.

(56) References Cited

U.S. PATENT DOCUMENTS

| 5,781,408 | A  | * | 7/1998  | Crane et al. ............. 361/679.57 |
| 6,373,692 | B1 | * | 4/2002  | Cheng ..................... 361/679.59 |
| 6,415,622 | B2 | * | 7/2002  | Kim et al. ...................... 62/409 |
| 6,452,788 | B1 | * | 9/2002  | Crowley ................. 361/679.37 |
| 6,678,154 | B2 | * | 1/2004  | DeLuga ................. 361/679.58 |
| 6,825,413 | B2 | * | 11/2004 | Jeon et al. ....................... 174/50 |
| 6,899,407 | B1 | * | 5/2005  | Lai ............................. 312/223.2 |
| 7,265,987 | B2 | * | 9/2007  | Zhang et al. ................... 361/727 |
| 7,375,955 | B2 | * | 5/2008  | Xu ............................ 361/679.55 |
| 2004/0104648 | A1 | * | 6/2004 | Chiang ......................... 312/323 |
| 2009/0027848 | A1 | * | 1/2009 | Yang ............................. 361/686 |
| 2009/0154080 | A1 | * | 6/2009 | Lee et al. ................. 361/679.02 |
| 2009/0252487 | A1 | * | 10/2009 | Matsumoto .................. 396/448 |

* cited by examiner

*Primary Examiner* — James O Hansen
*Assistant Examiner* — Matthew Ing
(74) *Attorney, Agent, or Firm* — Altis Law Group, Inc.

(57) ABSTRACT

A computer enclosure includes a front panel, a shielding member, and a linkage assembly. The front panel defines an opening and a pair of sliding slots beside the opening. Each of the sliding slots has a stop portion and a sliding portion. The shielding member includes a pair of sliding posts respectively received in the stop portions of the sliding slots. The linkage assembly is capable of pushing the shielding member to urge the sliding posts sliding from the stop portions to the sliding portions of the sliding slots. The shielding member is capable of covering the opening when the sliding posts are received in the stop portions of the sliding slots and capable of sliding along the sliding portions to expose the opening.

16 Claims, 9 Drawing Sheets

COMPUTER ENCLOSURE WITH SHIELD PLATE

BACKGROUND

1. Technical Field

The present disclosure relates to computer enclosures, and more particularly to a computer enclosure with a shield plate.

2. Description of Related Art

Many computers employ enclosures or cases which include peripheral/drive bays for receiving interchangeable peripheral drives and drives such as floppy disk drives, optical disk drives, and tape drives. Typically, these bays can be accessed through an opening in the front wall, or bezel, of the computer case. When one or more bays within the computer are empty (i.e., do not contain a peripheral device or drive), a cover or panel is provided for covering the opening in the front wall to prevent environmental contaminants from entering the computer.

In present computers, installation and removal of the cover is time consuming, difficult, and increases manufacturing costs for the computer when peripheral devices or drives are to be installed in the computer, and frustrating to the user of the computer who wishes to install peripheral devices or drives in after market situations.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
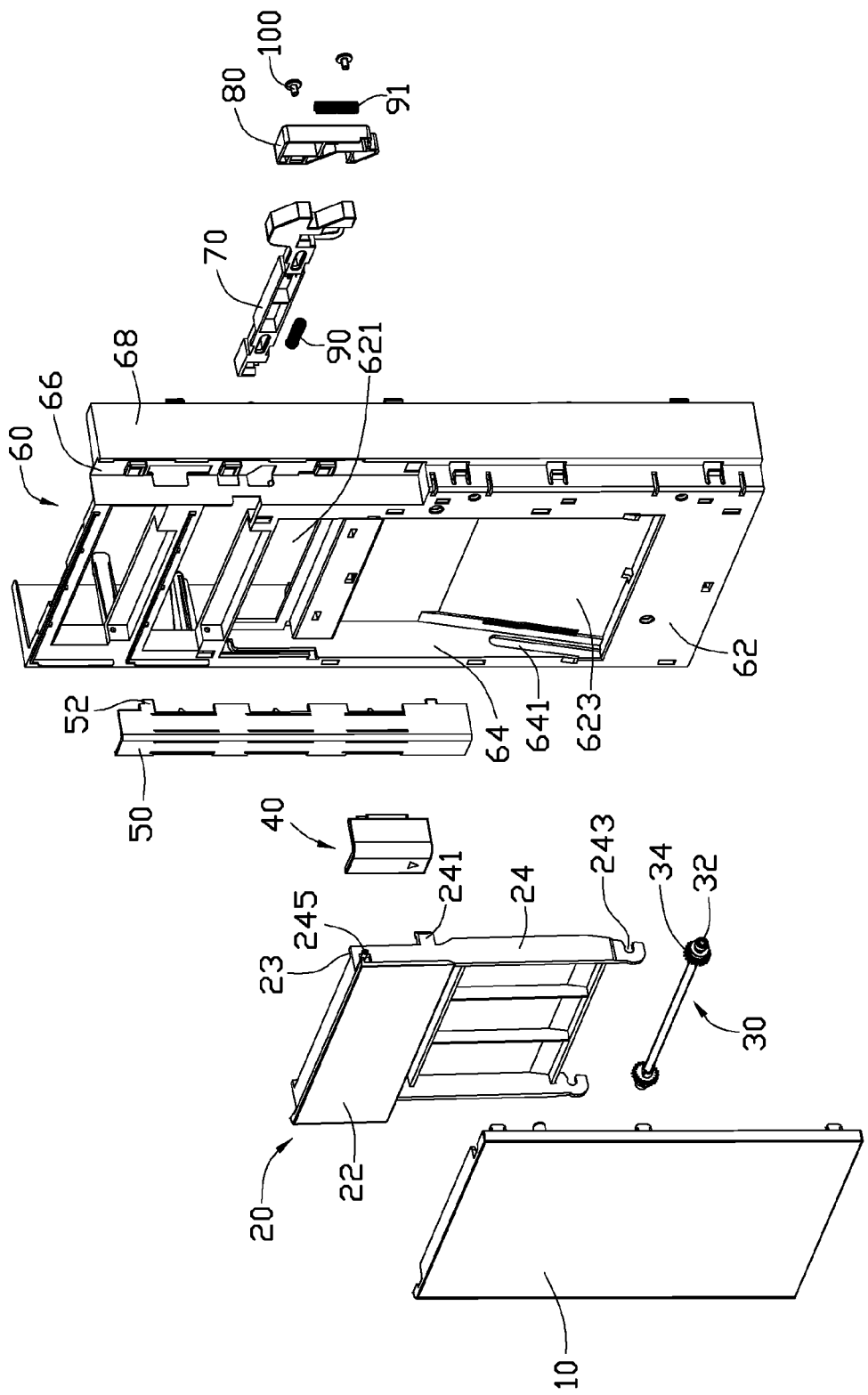
FIG. 1 is an exploded view of a partly shown computer enclosure to which a shielding member is to be attached according to an embodiment.
Figure 2:
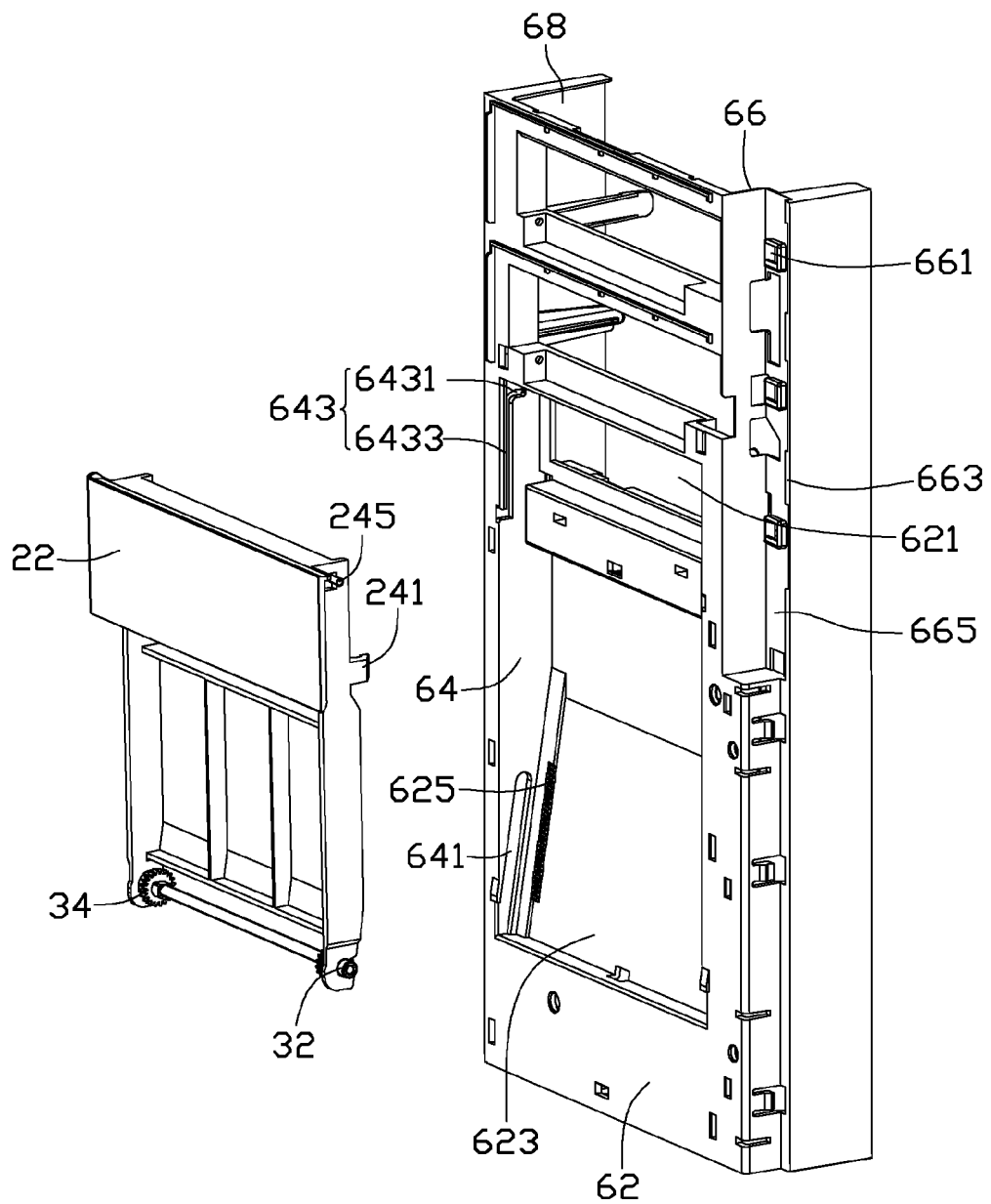
FIG. 2 is an enlarged view of the shielding member and a front panel in FIG. 1.

Referring to FIGS. 1 and 2, an embodiment of a computer disclosure includes a cover panel 10, a shielding member 20, a pivot shaft 30, an operation member 40, a support member 50, a front panel 60, a first linkage member 70, a second linkage member 80, a first elastic member 90, a second elastic member 91, and a pair of securing members (e.g., fasteners) 100.

The shielding member 20 includes a shield plate 22 and a frame 23 connected to a rear side of the shield plate 22. The frame 23 includes a pair of side flanges 24 perpendicular to the shield plate 22. A pair of pivot gaps 243 is defined in lower ends of the side flanges 24. A tab 241 protrudes from one of the side flanges 24. The tab 241 has a distal end with a inclined surface. A pair of sliding posts 245 protrudes from two upper ends of the shielding member 20.

The front panel 60 includes a main body 62, a pair of side walls 64 perpendicular to the main body 62, a inclined board 623 connecting the side walls 64, and an L-shaped cavity portion 66 for mounting the support member 50. The cavity portion 66 is defined at an upper corner of the front panel 60 and connecting between the main body 62 and one flange 68 of the front panel 60. An opening 621 above the inclined board 623 is defined in the main body 62 for exposing a drive bay (not shown) disposed in the computer enclosure. A pair of first sliding slots 641 is defined in the side walls 64 and located beside two sides of the inclined board 623. The first sliding slots 641 are parallel to the inclined board 623. A pair of second sliding slots 643 is defined in the side walls 64 and located beside two sides of the opening 621. Each of the second sliding slots 643 includes an arc-shaped portion 6431 and a lengthways portion 6433 connected to a lower end of the arc-shaped portion 6431. A pair of damping guide-ways 625 is defined at the inclined board 623.

The pivot shaft 30 has a pair of damping wheels 34 respectively attached to two distal ends 32 thereof. After the pivot shaft 30 is attached to the shielding member 20, the two ends 32 of the pivot shaft 30 are engaged in the pivot gaps 243 of the shielding member 20. The damping wheels 34 resist against the inner surfaces of the side flanges 24 of the shielding member 20.

Figure 3:
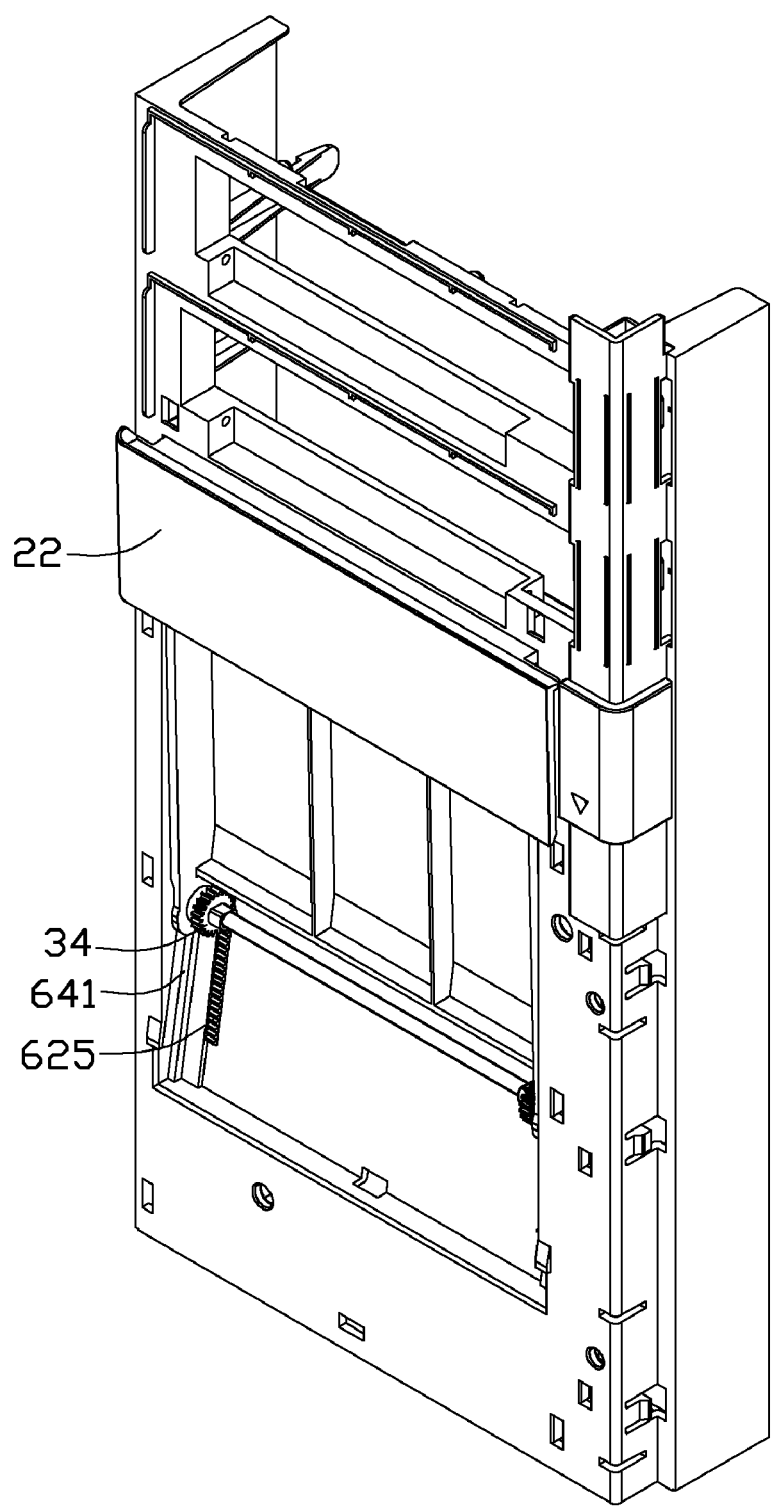
FIG. 3 is a partially assembled view of FIG. 1, showing the shield plate covering an opening defined in a front panel of the computer enclosure.

Referring to FIG. 3, in assembling the shielding member 20 to the front panel 60, the sliding posts 245 of the shielding member 20 are respectively received in and supported by the arc-shaped portions 6431 of the second sliding slots 643. The two ends 32 of the pivot shaft 30 are respectively received in upper ends of the first sliding slots 641. The damping wheels 34 of the pivot shafts 30 are respectively engaged with upper ends of the damping guide-ways 625 of the inclined board 623. The shield plate 22 of the shielding member 20 covers the opening 621 defined in the front panel 60.

Figure 4:
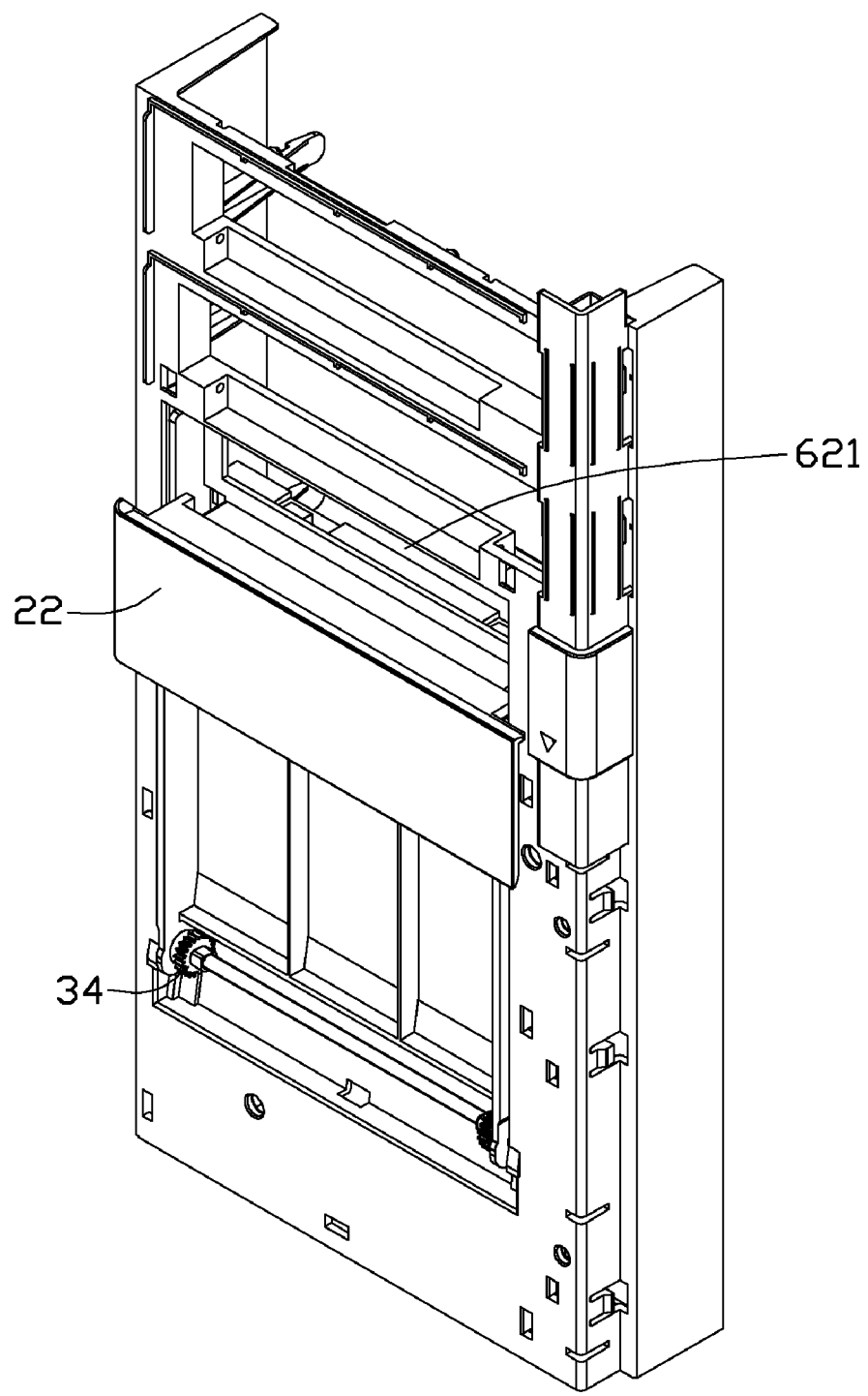
FIG. 4 is similar to FIG. 3, but showing the shielding plate removed to expose the opening.

Referring to FIG. 4, if a disk drive is to be mounted in the drive bay disposed in the computer enclosure through the opening 621, the shielding member 20 is slid to a position where the opening 621 is exposed. The sliding posts 245 of the shielding member 20 are slid to lower locations of the second sliding slots 643; the two ends 32 of the pivot shaft 30 are slid to lower locations of the first sliding slots 641; and the damping wheels 34 of the pivot shaft 30 stop at lower locations of the damping guide-ways 625.

Figure 5:
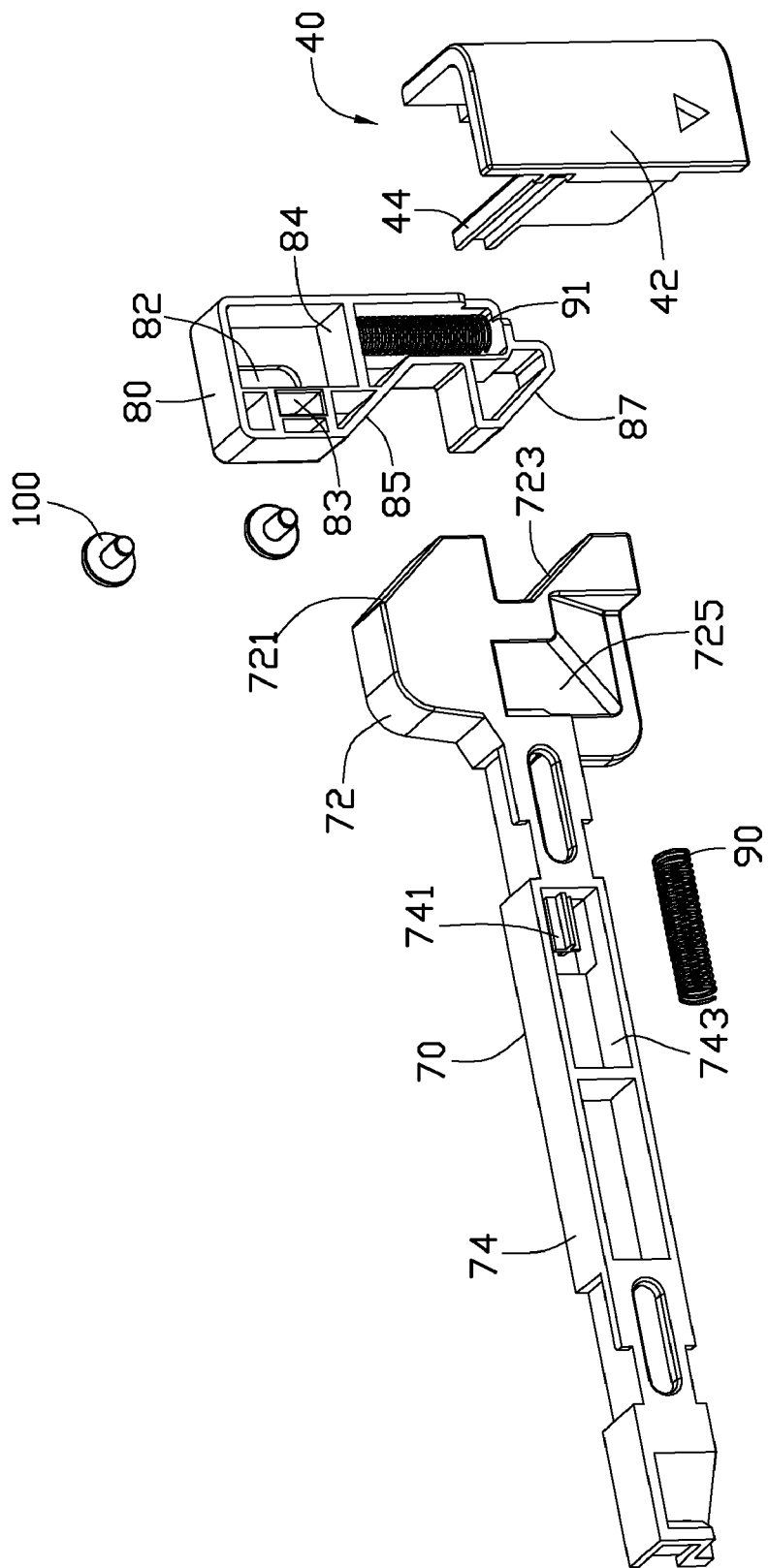
FIG. 5 is an exploded, enlarged view of a linkage assembly of FIG. 1.
Figure 6:
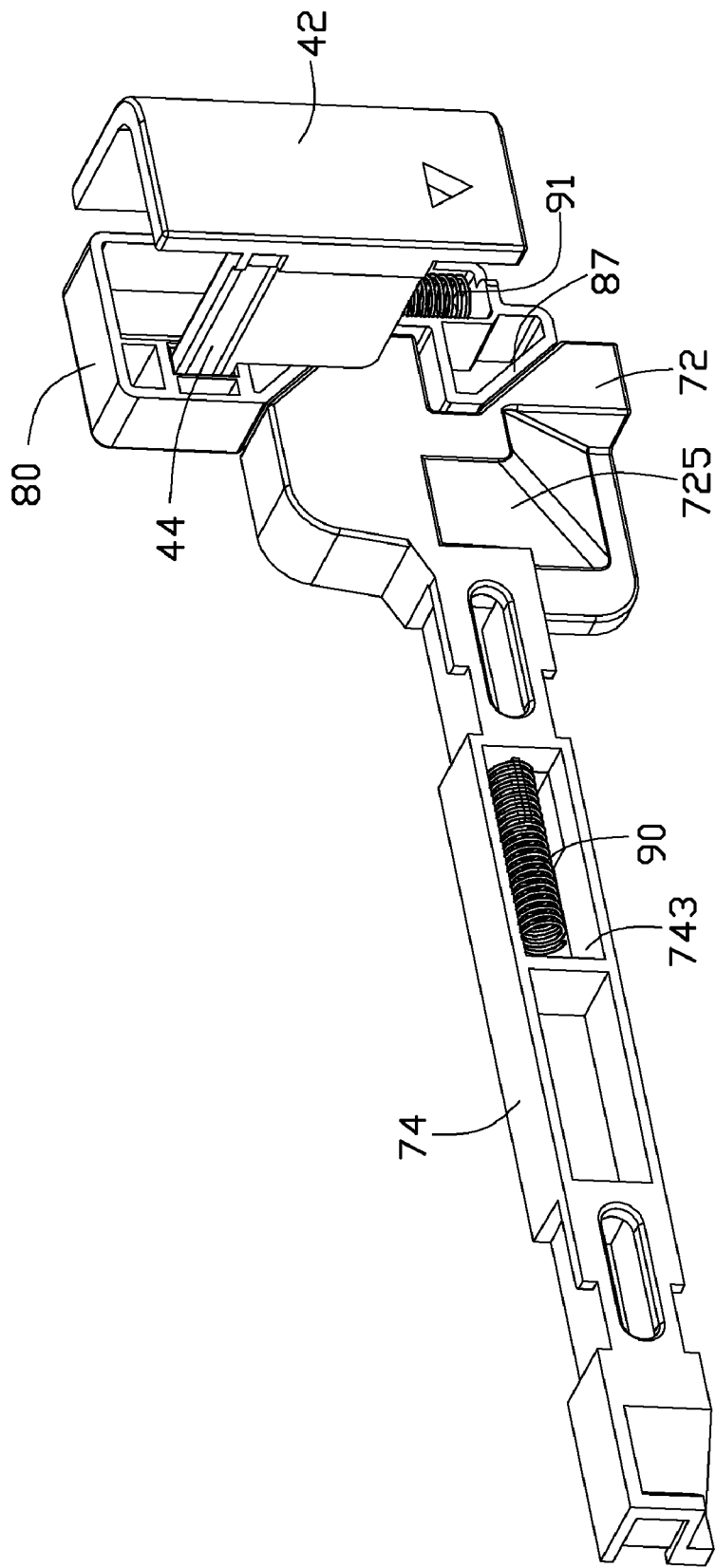
FIG. 6 is an assembled view of FIG. 5.

Referring to FIGS. 5 and 6, the operation member 40, the first linkage member 70, the second linkage member 80, the first elastic member 90, the second elastic member 91, and the securing members 100 are parts of a linkage assembly to allow removal of the shielding member (not labeled) 20 from the opening 621.

The operation member 40 includes an L-shaped main body 42 slidable along the support member 50 and an arm 44 extending from an inner surface of the main body 42.

The first linkage member 70 includes a head 72 and a lengthways shaft 74 connecting with the head 72. The head 72 of the first linkage member 70 includes a first inclined surface 721 and a second inclined surface 723 substantially parallel to the first inclined surface 721. A cavity is defined in the head 72 of the first linkage member 70 and has a third inclined surface 725 formed therein. A receiving cavity 743 is defined in the shaft 74 of the first linkage member 70 for receiving the first elastic member 90. A mounting post 741 is disposed in the receiving cavity 743 for engaging with the first elastic member 90.

The second linkage member 80 includes an upper portion, a lower portion, and a conjunction plate 84 disposed between the upper portion and the lower portion. Each of the upper portion and the lower portion defines a guiding slot 82 for receiving the securing member 100. An engaging cavity 83 is defined in the upper portion of the second linkage member 80 for receiving a distal end of the arm 44 of the operation member 40. A receiving cavity (not labeled), for receiving the second elastic member 91 therein, is defined in the lower portion of the second linkage member 80. The second linkage member 80 has a first inclined surface 85 and a second inclined surface 87, that is substantially parallel to the first inclined surface 85. In an assembled position (see FIG. 6), the first inclined surface 85 of the second linkage member 80 lays on the first inclined surface 721 of the first linkage member 70, and the second inclined surface 87 of the second linkage member 80 lays on the second inclined surface 723 of the first linkage member 70.

Figure 7:
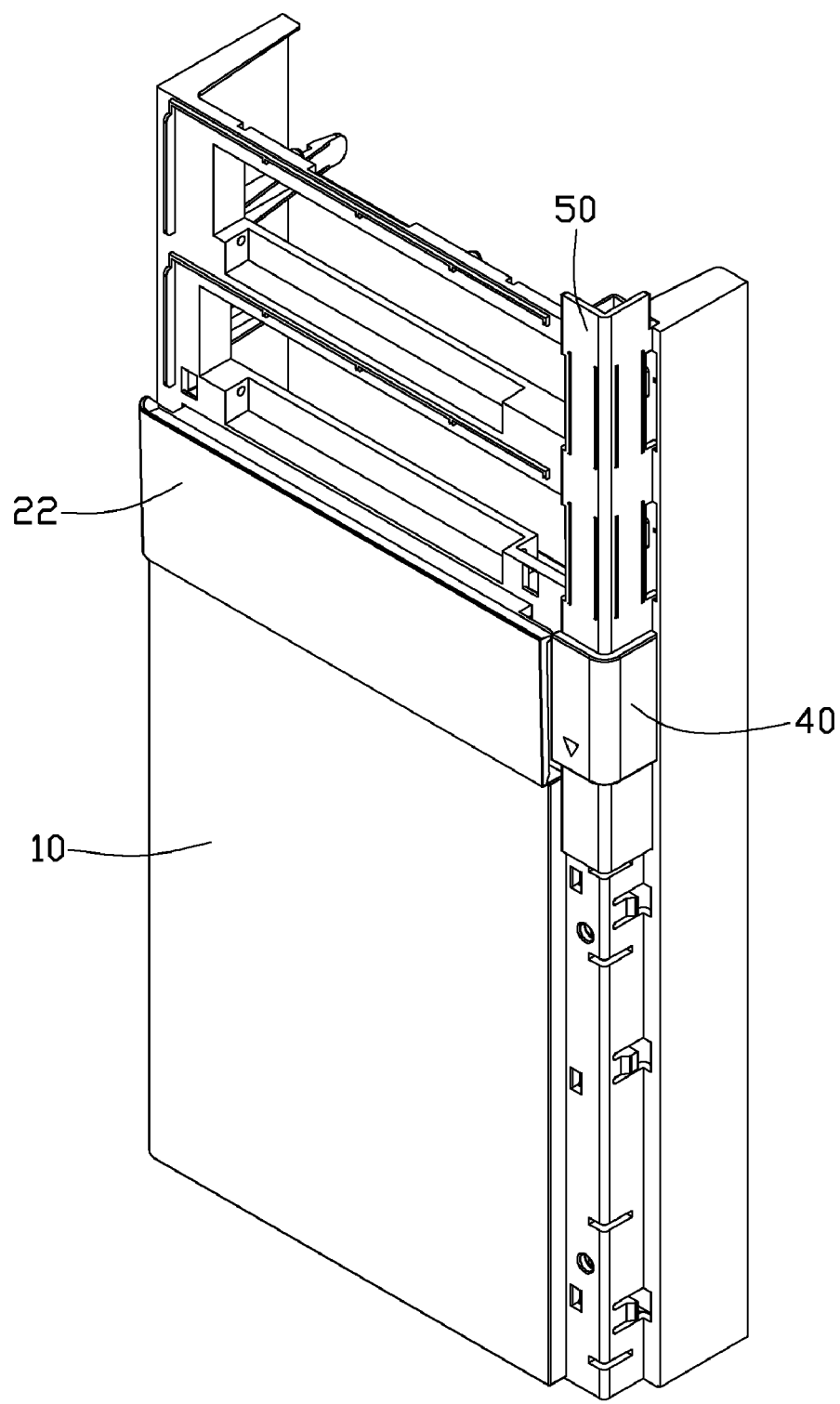
FIG. 7 is an assembled view of FIG. 1.
Figure 8:
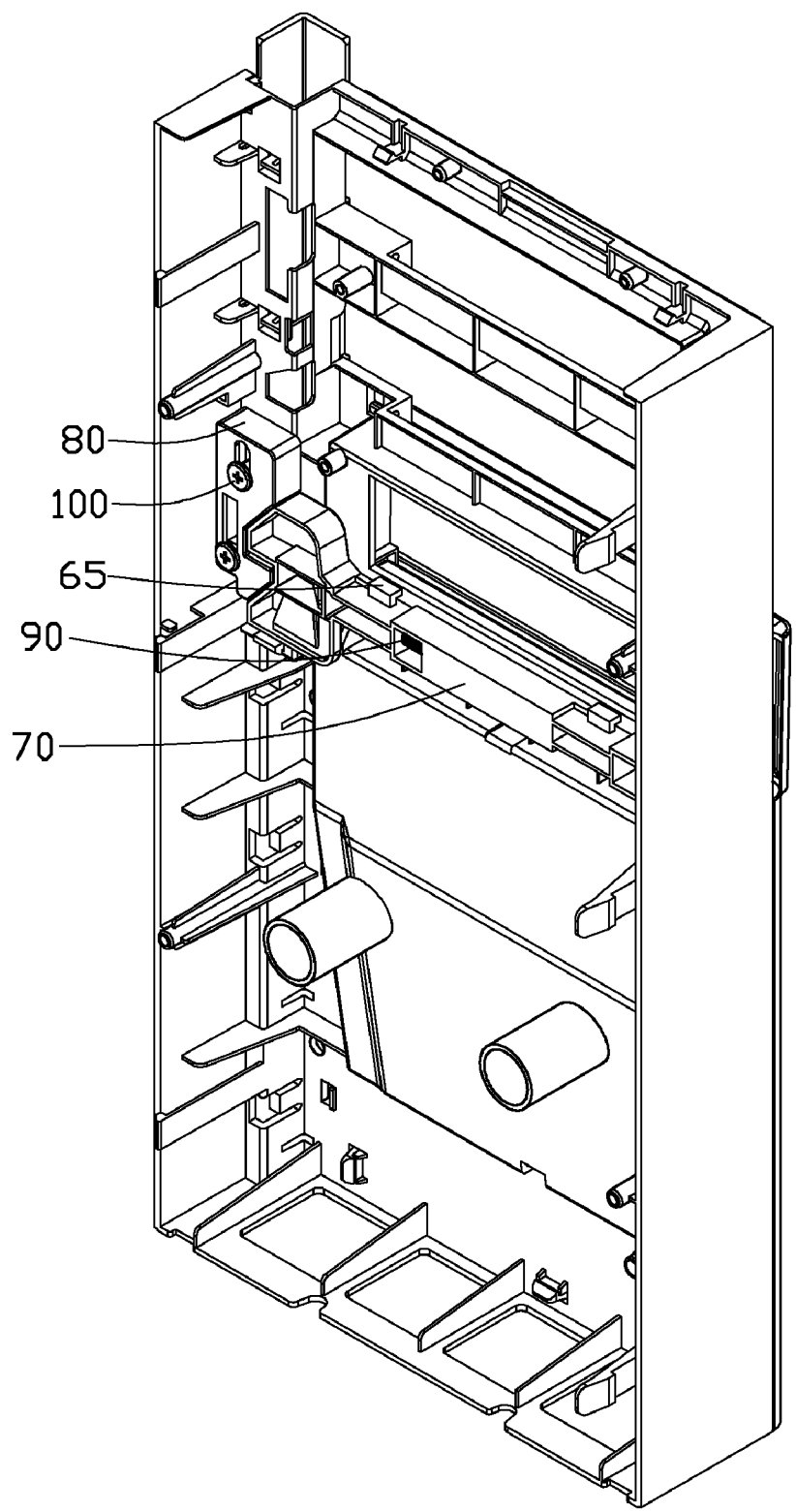
FIG. 8 is similar to FIG. 7, but viewed from another aspect.
Figure 9:
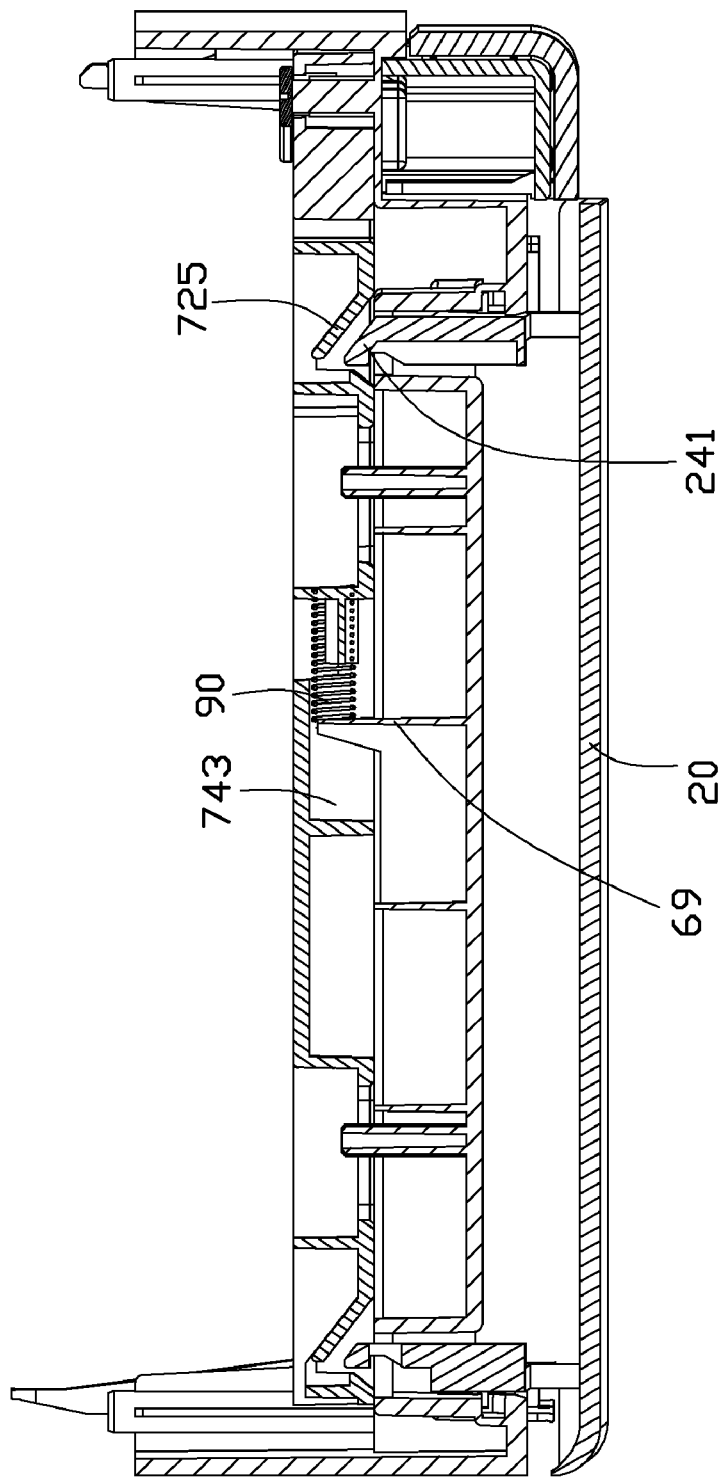
FIG. 9 is a cross-section view of FIG. 7 or FIG. 8.

Referring to FIGS. 7-9, in assembly the computer enclosure and the support member 50 are secured at the L-shaped cavity portion 66 of the front panel 60. The main body 42 of the operation member 40 is attached to the support member 50. The arm 44 of the operation member 40 extends through an aperture 663 defined in an edge of the front panel 60. The operation member 40 is slidable along the support member 50 along a vertical direction. A distal end of the arm 44 of the operation member 40 is mounted in the engaging cavity 83 of the second linkage member 80. The first linkage member 70 and the second linkage member 80 are attached to a rear side of the front panel 60. The securing members 100 respectively extend through the guiding slots 82 of the second linkage member 80 and are secured to the front panel 16. A length of each of the guiding slots 82 is greater than a diameter of the securing member 100, thus the second linkage member 80 can move along the vertical direction together with the operation member 40. The shaft 74 of the first linkage member 70 is engaged between upper and lower hooks 65 (see FIG. 8) formed at the rear side of the front panel 60. Then the first linkage member 70 is slidable along a horizontal direction. The first elastic member 90 is received in the receiving cavity 743 of the first linkage member 70 and engaged with the mounting post 741 in the receiving cavity 743. A first end of the first elastic member 90 resists against an inner surface of the receiving cavity 743, a second end of the first elastic member 90 resists against a resisting piece 69 (see FIG. 9) protruding from the rear side of the front panel 60. The second elastic member 91 is received in the mounting cavity of the second linkage member 80 and resists between the conjunction plate 84 and a resisting piece (not shown) protruding from the rear side of the front panel 60. The first elastic member 90 may force the first linkage member 70 to return to its original position along the horizontal plane. The second elastic member 91 can force the first linkage member 70 to return to its original position along the vertical direction.

The shielding member 20 is attached to the front panel 60 in a manner disclosed above. The tap 241 of the shielding member 20 extends into one opening defined in the front panel 60 and reaches the third inclined surface 725 of the first linkage member 70. The cover plate 10 is attached to the front panel 60 and located beneath the shield plate 22 of the shielding member 20. The shield plate 22 of the shielding member 20 covers the opening 621.

If a disk drive is to be mounted in the computer enclosure by way of the opening 621, the operation member 40 is slid down to enable access. The arm 44 of the operation member 40 pushes the second linkage member 80 down. The first inclined surface 85 of the second linkage member 80 pushes the first inclined surface 721 of the first linkage member 70. The second inclined surface 87 of the second linkage member 80 pushes the second inclined surface 723 of the first linkage member 70. Then the first linkage member 70 slides horizontally. The third inclined surface 725 pushes the tap 241 of the shielding member 20 and rotates the shielding member 20 away from the front panel 60. The sliding posts 245 of the shielding member 20 slide along the arc-shaped portions 6431 of the second sliding slots 643 until reaching the lengthways portions 6433 of the second sliding slots 643. Then the shielding member 20 can slide down along the first sliding slots 641 and the second sliding slots 643. The sliding posts 245 of the shielding member 20 slides along the lengthways portions 6433 of the second sliding slots 643 until reaching the lower ends of the second sliding slots 643. The two ends 32 of the pivot shaft 30 slide along the first sliding slots 641 until reaching the lower ends of the first sliding slots 641. The damping wheels 43 roll along the damping guide-ways 625 until reaching lower ends of the damping guide-ways 625. Then the opening 621 is exposed to permit installation of the disk drive in the computer enclosure.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure comprising:
    a front panel with an opening defined therein;
    a shielding member, pivotably attached to a front side of the front panel about an axis, capable of sliding from a first position, where the shielding member covers the opening, to a second position, where the shielding member is removed from the opening;
    a first linkage member, attached to a rear side of the front panel, capable of moving along a first direction and urging the shielding member to rotate away from the first position;
    a second linkage member, attached to the rear side of the front panel, capable of moving along a second direction and urging the first linkage member to move along the first direction;
    a first elastic member attached to the first linkage member for urging the first linkage member to return to its original position; and
    a second elastic member attached to the second linkage member for urging the second linkage member to return to its original position;
    wherein the axis is substantially perpendicular to a sliding direction of the shielding member, and the first direction is substantially parallel to the axis and substantially perpendicular to the second direction.

2. The computer enclosure of claim 1, wherein the second linkage member is capable of urging the first linkage member to move along the first direction, the first linkage member is capable of urging the shielding member to rotate slightly when the first linkage member slides along the first direction.

3. The computer enclosure of claim 2, wherein the shielding member comprises a protruded tab abutting the first linkage member, the first linkage member is capable of pushing the protruded tab to urge the shielding member to rotate slightly when the first linkage member slides along the first direction.

4. The computer enclosure of claim 1, further comprising an operation member attached to the front panel, wherein the operation member comprises a main body and an arm engaged with the second linkage member, and the operation member is capable of urging the second linkage member to move along the second direction.

5. The computer enclosure of claim 1, wherein the first linkage member comprises an inclined surface abutting against the second linkage member.

6. The computer enclosure of claim 1, further comprising a pivot shaft attached to the shielding member.

7. The computer enclosure of claim 6, wherein the shielding member comprises a shield plate, configured to cover the opening, and a frame connected to a rear side of the shield plate, and the pivot shaft is attached to a lower portion of the frame.

8. The computer enclosure of claim 1, wherein the sliding direction is inclined relative to the second direction.

9. A computer enclosure comprising:
a front panel defining an opening and a pair of slots besides the opening, each of the slots having a stop portion and a sliding portion;
a shielding member comprising a pair of sliding posts respectively received in the stop portions of the slots;
a linkage assembly comprising a first linkage member capable of moving along a first direction to push the shielding member and urge the sliding posts to slide from the stop portions to the sliding portions, a second linkage member capable of moving along a second direction to urge the first linkage member moving along the first direction, a first elastic member attached to the first linkage member to urge the first linkage member to return to its original position, and a second elastic member attached to the second linkage member to urge the second linkage member to return to its original position;
wherein the shielding member is capable of covering the opening when the sliding posts are received in the stop portions of the slots and capable of sliding along the sliding portions of the slots to expose the opening.

10. The computer enclosure of claim 9, wherein the second linkage member is capable of urging the first linkage member to move along the first direction, the first linkage member is capable of urging the shielding member to rotate slightly when the first linkage member slides along the first direction.

11. The computer enclosure of claim 10, wherein the shielding member comprises a protruded tab abutting the first linkage member, and the first linkage member is capable of pushing the tap of the shielding member to urge the shielding member to rotate slightly when the first linkage member slides along the first direction.

12. The computer enclosure of claim 11, wherein the linkage assembly further comprises an operation member attached to the front panel, the operation member comprises a main body and an arm extending through an aperture defined in the front panel, a distal end of the arm is engaged with the second linkage member, and the operation member is capable of urging the second linkage member to move along the second direction.

13. The computer enclosure of claim 12, wherein the first linkage member comprises an inclined surface resisted against the second linkage member.

14. The computer enclosure of claim 9, further comprising a pivot shaft attached to the shielding member.

15. The computer enclosure of claim 14, wherein the shielding member comprises a shield plate configured to cover the opening and a frame connected to a rear side of the shield plate, and the pivot shaft is attached to a lower portion of the frame.

16. The computer enclosure of claim 15, wherein the front panel further comprises a pair of sliding slots for receiving two ends of the pivot shaft.

* * * * *